United States Patent [19]

Mironoff

[11] Patent Number: 4,788,399
[45] Date of Patent: Nov. 29, 1988

[54] ELECTRICAL CIRCUIT FOR ELECTRO-DISCHARGE MACHINES

[76] Inventor: Nicolas Mironoff, 1295 Mies, Switzerland

[21] Appl. No.: 848,379
[22] PCT Filed: Jun. 27, 1985
[86] PCT No.: PCT/CH85/00103
§ 371 Date: Apr. 7, 1986
§ 102(e) Date: Apr. 7, 1986
[87] PCT Pub. No.: WO86/00249
PCT Pub. Date: Jan. 16, 1986

[30] Foreign Application Priority Data

Jun. 29, 1984 [WO] PCT Int'l Appl. ............. PCT/CH84/00108

[51] Int. Cl.[4] .............................................. B23H 1/02
[52] U.S. Cl. .................................................. 219/69 P
[58] Field of Search ............... 219/69 P, 69 C, 695; 323/266, 271, 272

[56] References Cited

U.S. PATENT DOCUMENTS

| | | | |
|---|---|---|---|
| 2,979,639 | 4/1961 | Williams et al. | 219/69 P |
| 3,202,599 | 8/1965 | Schierholt | 219/69 C |
| 3,485,988 | 12/1969 | Sennowitz | 219/69 P |
| 3,504,154 | 3/1970 | Marcolini | 219/69 C |
| 3,590,364 | 6/1971 | Okun | 323/286 |
| 3,604,885 | 9/1971 | Inoue | 219/69 P |
| 3,655,936 | 4/1972 | Saito et al. | 219/69 P |
| 3,655,937 | 4/1972 | Ullmann et al. | 219/69 P |
| 3,668,361 | 6/1972 | O'Connor | 219/69 C |
| 3,832,510 | 8/1974 | Pfau et al. | 219/69 C |
| 3,893,013 | 7/1975 | Mironoff | 219/69 C |
| 3,909,701 | 9/1975 | Waehner | 323/271 |
| 4,132,925 | 1/1979 | Schmutzer et al. | 323/286 |
| 4,237,370 | 12/1980 | Ullmann | 219/69 P |
| 4,302,726 | 11/1981 | Shobbrook | 323/271 |
| 4,347,425 | 8/1982 | Obara | 219/69 P |
| 4,535,217 | 8/1985 | de Bruyn | 219/69 P |

FOREIGN PATENT DOCUMENTS

| | | | |
|---|---|---|---|
| 101337 | 8/1980 | Japan | 219/69 C |
| 56-62727 | 5/1981 | Japan | 219/69 C |
| 192473 | 11/1983 | Japan | 219/69 C |
| 196923 | 11/1983 | Japan | 219/69 C |

*Primary Examiner*—A. D. Pellinen
*Assistant Examiner*—Geoffrey S. Evans
*Attorney, Agent, or Firm*—Pollock, Vande Sande and Priddy

[57] ABSTRACT

An electrical discharge machining circuit with preignition circuitry including a step up transformer and a zener diode to provide preignition pulses (having a higher voltage but lower energy than erosive pulses) prior to erosive pulses. Additionally a resistor and a second zener diode are placed in series to each other and in parallel to the machining gap to limit the voltage of the preignition pulses. Alternative embodiments teach using a preignition control transistor associated with a variable resistor to control the maximum value of the current in the preignition pulses and using an indicator such as an electronic voltmeter, an oscilloscope, or a lamp with the preignition circuitry.

9 Claims, 6 Drawing Sheets

ELECTRICAL CIRCUIT FOR ELECTRO-DISCHARGE MACHINES

The invention relates to an electrical circuit for electro-discharge machines, machining a workpiece by electro-erosive discharges in a dielectric medium with a machining gap between the electrode-tool and the workpiece, this last constituting itself an electrode, comprising means delivering erosive discharges through terminals supplying respectively said electrodes with the electrical erosive energy pulses and means for preignition supplying in the beginning of each erosive pulse a preignition pulse of higher voltage and lower energy than said erosive pulses, which ignite or ionize in the dielectric medium inside the machining gap each time a channel through which travels then the erosive discharge.

A circuit according to this generic definition is already known, namely in the description of the U.S. Pat. No. 3,893,013 in the name of the present inventor.

Besides, the description of the U.S. Pat. No. 3,604,885, mentioned as a "technical background", proposes a circuit nearing also the above mentioned generic description.

Nevertheless, formerly it has never been proposed means for regulation of the preignition voltage to a value considered as favourable, the inconstancy of the preignition peak voltage being a source of perturbations lowering the efficiency and the quality of the machining. The risk of the indesireable preignition peak voltage fluctuations is particularly great if the preignition energy is borrowed from the element such as the machining capacitor which temporarily and repeatedly accumulates the electrical erosive discharge energy. The document PCT/CF 84/00108 (priority here claimed, publication 1985) exposes, in its first fourteen pages, the general and detailed technical considerations regarding the electro-discharge machining. These fourteen pages are considered as included in the present specification by way of reference.

In a general way, the present invention aims to improve the electro-discharge machining systems with preignition previously known, the purpose of the present invention being particularly to provide an electrical circuit for an electro-discharge machine, working according to the preignition principle, in which the drawbacks of the previous systems can be avoided and especially in which the parameters conditioning the channel ignition as well as that of the electro-discharge machining could be adequately mastered.

According to the invention, the circuit for electrical discharge machining following the abovementioned generic description, realizes performances aimed by one or another independent claims statements. It should be pointed out that the characteristics stated in each independent claim intervene respectively for different problems of preignition stabilization.

Dependent claims define different embodiments of the invention which are particularly advantageous especially as regards the voltage stability, an easy detection of the tendency of the preignition energy rise, the constitution of the circuit allowing the preignition energy stabilisation manually or automatically, the simplicity and efficiency of preignition pulse generation, etc. . .

Regarding the particularity of the invention, it should be pointed out that the mentioned means of clamping can have either a voltage limiting characteristic, without a voltage stabilisation (for example, a Zener diode in series with a not negligible resistor), or having a really current stabilizing characteristic (for example a Zener diode without an ohmic resistance in series).

The machining gap being supposed to present an electro-disruptive characteristic, a parallel connection of a clamping circuit also supposed to be electro-disruptive, may seem paradoxical. In fact, everything being well considered, this paradox does not exist, since on the one hand, the machining gap is not equivalent to a classical electro-disruptive element and, on the other hand, there are means allowing to control the gap according to the preignition pulse parameters, which maintain equal both voltage values "apparently electro-disruptive" (but in which is admitted in reality a certain variation allowing to match one another).

As regards the abovementioned means of controlling the gap, i.e., means usually motorized, of the repositioning of the electrode-tool relatively to the workpiece, it should be noted that, in certain particular embodiments, it is possible to dispense with such means. For example, in case of an electrical discharge machine in which the electrode-tool would be aimed only to print a bas-relief of very small depth. This workpiece can be put on the right place when the electrical circuit is out, the electrode-tool fixed just at a desired distance, after which the electrical means would be connected to print the bas-relief without a movement of the electrode-tool. After that the workpiece will be removed and another workpiece put on the same place. For this reason it does not appear adequate to mention means for the electrode-tool repositioning in the most general description of the subject of the invention.

Included schemes illustrate, by way of example, and starting by presenting a previously known embodiments, some realizations of the invention.

FIG. 1 represents a circuit for electrical discharge machining using a preignition system previously known and particularly stated in U.S. Pat. No. 3,983,013.

FIG. 2 represents with more details the part of preignition pulse generation and application.

Figure 1:
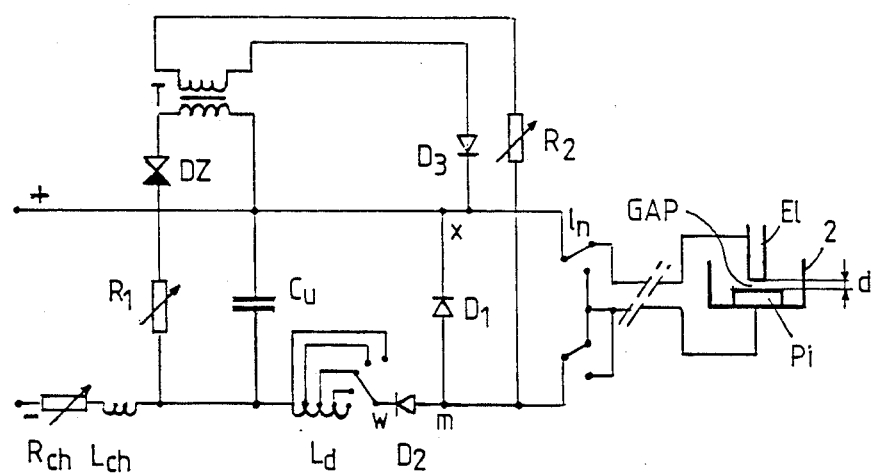

In the circuit for electro-discharge machining represented on FIG. 1, already known and described in U.S. Pat. No. 3,893,013, we find a condenser $C_u$ fed by a d.c. source through impedance $R_{ch}$ and $L_{ch}$, charged to a certain voltage and discharging periodically in the form of erosive pulses in the machining gap d. An adjustable inductance $L_d$ allows to regulate the erosive pulse duration and, at the same time, softens the current jumping particularly at the moment of the erosive pulse starting. Diodes $D_1$ and $D_2$ render the erosive pulses unipolar preventing current oscillation during the discharge. The inversor $I_n$ allows to invert the polarity between the electrodetool and the workpiece.

Figure 6:
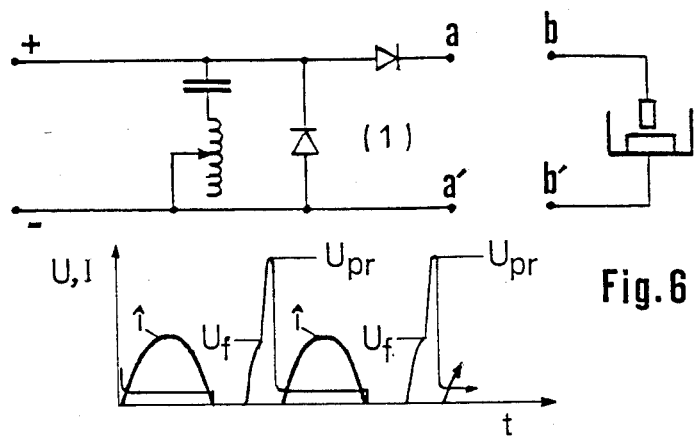
FIG. 6 is a skeleton schematic with voltage and current diagrams illustrating the working principle of the circuit as a whole in the case when erosive pulse generating is realized by means of a relaxation circuit with a capacitor charged and discharged periodically.

The principle of erosive pulse generation with the circuit of FIG. 1 is analogous to that represented on FIG. 6. Nevertheless, the circuit of FIG. 1, according to the former knowledge, comprises preignition means of a rudimentary type, while FIG. 6 illustrates a principle of erosive pulse generation as one to which the invention can be easily applied (although elements characterising the invention, namely those regarding the preignition system, are not represented on this FIG. 6).

Coming back to FIG. 1, one sees that this circuit comprises preignition means including a step up transformer T, a Zener diode DZ, a variable resistor $R_1$, a variable resistor $R_2$ and a Diode $D_3$. It is easy to understand that when the condenser $C_u$ charging voltage reaches a value determined by Zener diode DZ, which is a little inferior to the feeding voltage, a current starts to flow in the primary of transformer T through resistor $R_1$. The rising of the current induces a pulse of a higher voltage in the secondary which is connected in parallel across the gap through diode D3 and a variable resistor $R_2$. The energy delivered by this preignition pulse depends on the components parameters, the preignition voltage falling naturally as soon as the preignition current starts, but in a way which is difficult to determine. In this system, neither the preignition voltage nor the preignition energy can be adequately controlled.

Experience shows that the circuit according to the former knowledge represented on FIG. 1, can be used for industrial purposes only in very restricted conditions. This is for the following reasons:

The mode of connection of the transformer T secondary constrains the transformation ratio to be very high, which involves an important consumption of current delivered by the machining condenser $C_u$. Moreover, in this case, transformer T presents inductive characteristics unfavourable to preignition pulse generation and particularly to the control of its parameters.

After the current increasing stage, an important direct current kept on flowing through the transformer primary, Zener diode and resistor in series. A big part of energy was thus lost (producing sometimes an excessive heating). This involved also a useless dissipation of the machining power.

In cases when the condenser $C_u$ charge was characterised by steep curves, as well as when using square pulses generated by electronic means, the transformation of a part of erosive pulse energy into preignition pulse was practically impossible because of a very low efficiency.

The preignition pulses being completely dependent, as regards their voltage and their current, i.e., their energy, on the machining power and the erosive pulse characteristics, preignition pulse parameters escaped all possibility of control. Important variations of preignition pulses provoked very harmful effects. One observed often spontaneous energy rises and particularly voltage rises which produced an excessive ionization of the dielectric medium, generating shortcircuits and arcs.

Besides, these parasite phenomenae (such as the abovementioned as well as many other) supplied the servo-motor controlling the electrode automatic advance with incoherent information, so that this last was not able to maintain a correct machining gap rendering unstable the whole machining process.

Briefly, the application of this circuit was possible only in particular and very limited conditions, limited in voltage, current and capacitance of the machining condenser, in other terms, it could be applied only in the case of very low machining power. Moreover, this preignition system could not be applied to other systems of erosive pulse generation.

Thus, it is obvious that the preignition principle cannot be correctly applied providing all its advantages unless certain important conditions are fulfilled. The invention has just the purpose of satisfying these conditions which are as follows :

(1) The preignition pulse parameters must be determined exclusively in function of their ionizing effect, remaining as strictly independent as possible from the machining rate and the power applied, as well as from the erosive pulse current form and other characteristics of the pulse generator.

(2) The preignition pulse voltage should be constant and if possible strictly limited to a determined value, this voltage being also can important factor fixing, by means of the positioning of the electrode, the machining gap, as well as determining thus the value of the "cutting interstice" (i.e., the difference between the dimensions of the electrode-tool and that of the machined form).

(3) The preignition pulse energy must present only the smallest part of the erosive pulse energy and must produce only a channel ionizing effect. The mutual influence between preignition and erosive pulse characteristics must be reduced to a minimum.

(4) In order to secure a correct channel ionization in different machining conditions it is necessary to adapt the preignition pulse energy to these conditions with at least a manual adjusting and, if possible, with an automatic control.

(5) The moment of the preignition pulse application should be adequately determined in function of the erosive pulse electrical potential available.

(6) The preignition pulse duration, i.e., its ionizing effect, must be as short as possible; the preignition pulse must stop as soon as the channel is ionized and the erosive pulse current starts to flow.

Experience shows that the best technological effects, i.e., the highest material removal rate and the lowest electrode-tool wear, are reached when the abovementioned conditions are satisfied. It is obvious that some of these conditions can be more imperative than others. The most important is the regularity of the preignition voltage, followed immediately by the regularity of preignition energy.

The purpose of the invention, different embodiments of which will be described now in relation to FIG. 2, and following, allows to realize an efficient and complete control of these preignition pulse parameters providing their adequate ionizing effect whatever the machining rate or power, practically independent from other technological conditions. Another purpose of the invention is to realise this control automatically.

Figure 2:
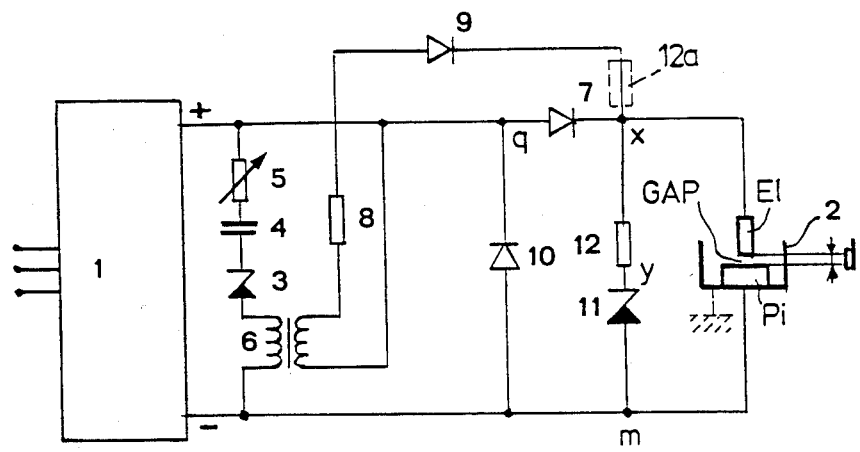
FIG. 2 is a schematic diagram of a electrical circuit for electro-discharge machining according to the invention, this
Figure 7:
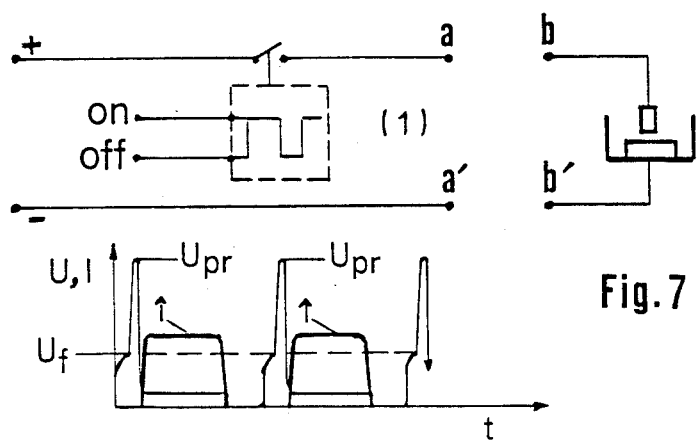
FIG. 7 is a skeleton schematic similar to that of FIG. 6, but showing the case when these erosive pulse generating means are of electronical commutation which provides waves of rectangular form

In the circuit, schematically represented on FIG. 2, the means delivering erosive discharges 1 can be similar to the assembly of the condensor $C_u$ and peripheric components represented by FIG. 1. Nevertheless, the circuit 1 feeding the erosive discharges of FIG. 2, can also be constituted differently, for example, by means of electronic commutations. The upper parts of FIG. 6 and 7 illustrate two different means according to which the circuit 1 feeding the erosive discharges can be constituted and working.

On FIG. 2, the mechanical device 2 for electro-discharge machining comprises a tank filled with a dielectric liquid in which an electrode-tool El is placed just above a workpiece Pi. The circuit 1 delivering electro-erosive pulses is connected across both electrodes which constitute the electrode-tool and the workpiece, only through a diode 7 necessary to apply the preignition pulses. A diode 10 prevents the inversion of the voltage polarity across the gap, i.e., on electrode El and workpiece Pi.

FIG. 2 illustrates in detail only the preignition circuit. One sees that it comprises a voltage step up transformer 6 which generates the preignition pulses. An adjustable resistor 5, a condenser 4 and a Zener diode 3 are connected in series with the primary of the transformer 6, all this series branch being connected across the feeding circuit 1. Besides, the secondary of the transformer 6 is connected through a limiting resistor 8 and a diode 9, across the abovementioned diode 7.

One understands well that, before the starting of the erosive pulse, the feeding voltage delivered by circuit 1, which was nil at the end of the preceding erosive pulse, starts to increase and exceeds the characteristic voltage of Zener diode 3. Condenser 4 begins then to be charged through resistor 5, Zener diode 3, and the primary of step up transformer 6. The current, limited in the beginning by the transformer inductance, increases rapidly as long as the feeding voltage is in the state of increase. The voltage induced by current rise in the transformer primary appears also in the secondary in the form of a pulse of considerably higher voltage, but only with a relatively low current. This voltage is applied across diode 7, polarized then in its blocking direction. Thus, the voltage across the gap d is equal to the sum of the erosive pulse feeding voltage (across the output of circuit 1) and that of the preignition pulse (the secondary of transformer 6). Condenser 4 serves to avoid the flowing of the current in the primary of the transformer, current which is conditioned exclusively by the characteristics of the Zener diode, the ohmic resistance and the self-inductance of the transformer. Experience shows that without this condenser, the preignition pulse becomes untidy, probably because of its too steep rise, or being also influenced by too high a serial impedance. On the contrary, with the condenser 4 in series, one gets, as the experience shows, an adequate and efficient preignition pulse. It is probable that a charging-discharging process on the inversed polarity occurs in condenser 4. Without entering into a deeper study of this subject, it is nevertheless observed that the condenser 4 produces a beneficient effect on the preignition pulse.

Briefly, the inclusion of condenser 4 provides the following advantages:

(1) Elimination of the direct current flow in the transformer primary.

(2) Better determination of the time of current increase duration in the transformer primary, allowing the generation of the amount of energy necessary to the preignition and a control of the moment of the preignition application (3) Maintenance of the preignition voltage at least during the time necessary to a correct channel ionization in the gap.

(4) Restitution, in the machining circuit, of the exceeding amount of energy.

(5) Possibility, by an adequate choice of the condenser 4 capacity and the value of resistor 6, to provide the creation of the preignition pulse of short duration just sufficient for an efficient firing of the channel, but avoiding the risk of an excessive prolongation of its ionizing effect. Thus, the serial connection of condenser 4 is favourable because it provides preignition pulses of an adequate energy. Yet, there is another point which contributes to a rational application of the preignition principle. Indeed, in spite of the fact that the abovementioned means allow a regular preignition pulse generation, the variation of the conditions in the machining zone itself (i.e., in the gap), resulting from the fluctuations of the dielectric medium characteristics such as accumulation of machining residues in the form of conductive particles, gas formation, settling of carbon, etc., which can provoke variations of this dielectric medium electrical resistance, whence the difficulty to control fluctuations of the preignition pulse voltage.

This is the reason why, according to the invention, a preignition voltage clamping branch is provided comprising Zener diode 11 (eventually several Zener diodes in series) and a resistor 12 in series with this Zener diode, the whole of these elements being connected directly across the gap. One obtains thus a stabilization of the preignition pulse voltage.

In the comments stated previously to this description, it was already mentioned that the connection in parallel of two components having an electro-disruptive characteristic was not paradoxical in spite of the appearance. This is, on the one hand, because the gap does not present classical electro-disruptive characteristics and, on the other hand, because there exists usually, but not represented on the schematics, a device controlling the position and an automatic movement of the electrode-tool, which, when appears the channel preignition voltage, establishes automatically the desired value of the gap. In this case, the serial assembly 11, 12, could present not only a clamping characteristic, but also that of the voltage stabilization, i.e., the maximum voltage drop across resistor 12 will be small in relation to the characteristic voltage of Zener diode 11. The presence of resistor 12 is explained by its use in the improvements which will be explained in relation to FIG. 3 and 4. It should be noted that in the absence—always possible—of the electrode automatic positioning, the resistor 12 could be advantageously increased in order to provoke an ohmic voltage drop able to divide the current between the gap and the Zener diode 11 even in the case when the value of the gap d could be not quite adequate.

With the clamping branch 11, 12, the circuit of FIG. 2 provides the stabilization of the preignition pulse voltage. Nevertheless, it appears that in order to provide a really adequate preignition pulse, it is helpful to control also its energy parameter. Other forms of the embodiment of the invention which will be described now respectively to FIG. 3 and 4, provide additional means for controlling the preignition pulse parameters.

Figure 3:
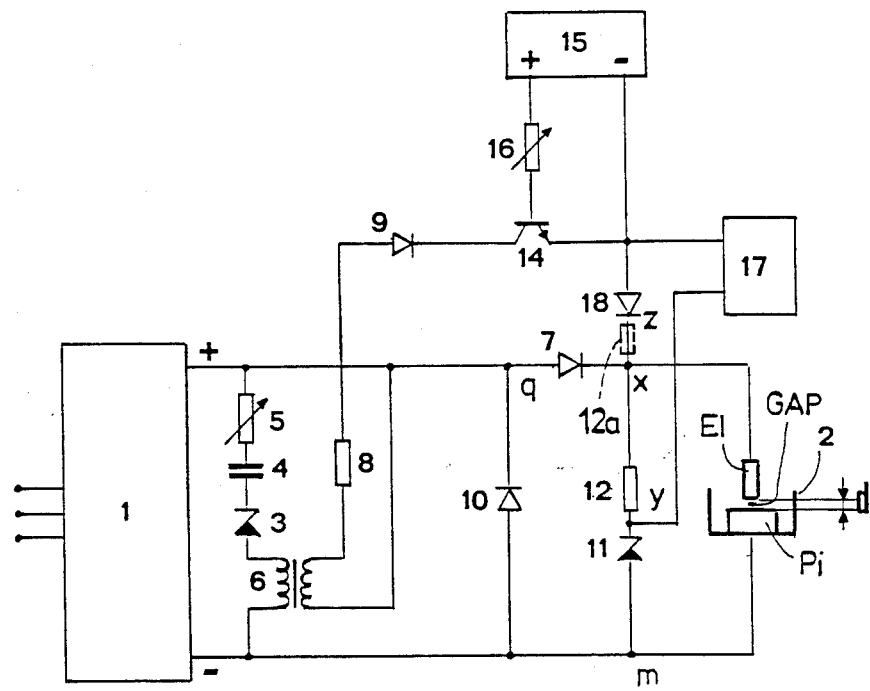
FIG. 3 is a schematic of an embodiment of the invention analogous to that of FIG. 2, but comprising signalling means providing indications of an exceeding preignition energy as well as means of a manual control allowing to reduce this exceeding energy according to said indications.
Figure 4:
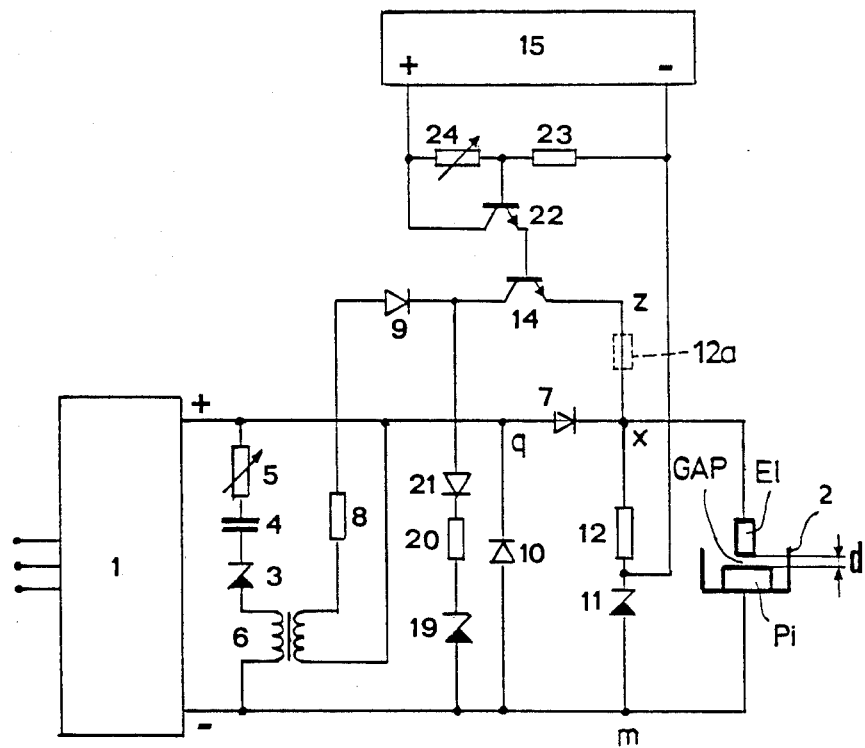
FIG. 4 is a schematic of another embodiment of the invention analogous to that of FIG. 3, but providing additional means for an automatic limitation of the preignition energy.

The embodiment of the invention according to FIG. 3 includes all the elements represented on FIG. 2 with the addition of transistor 14 limiting the preignition pulse current, an auxiliary voltage supply 15, a variable resistor 16, a diode 18 and an indicator 17. The emitter-collector line of transistor 14 is connected in series with resistor 8 and diode 9 already described in relation to FIG. 2. This emitter-collector line is controlled by the current in the emitter-base line of transistor 14. This current, supplied by the auxiliary source 15, is adjustable by means of the variable resistor 16. More precisely, the variable resistor 16 allows to establish the maximum value of the current which can flow in the emitter-collector line of transistor 15 during the preignition pulse. The indicator 17 is also supplied by the auxiliary source 15 and its input is connected to the point between diode 11 and resistor 12 in the voltage clamping branch already described in relation to FIG. 2.

The circuit of indicator 17 can be realized in different manners. For example, it can be an electronic voltmeter memorizing voltage drop points across resistor 12, which are representative of the clamped current peak values. This indicator 17 can also be an oscilloscope showing the proceeding of clamped current. It can be an electronic circuit detecting only the voltage drop points across resistor 12 (increased by an almost constant voltage drop across diode 18), which can present peaks either exceeding or not exceeding a given value. According to the case, indicator 17 will provide information allowing the operator to know this voltage drop across resistor 12. This indicator 17 can also be a lamp or another optical device indicating that the points of current exceed or not a given limit. Moreover, it can be a numerical indicator giving the exact value of this current, or even a needle indicator, etc...

Such an embodiment according to FIG. 3 will give the operator the information delivered by indicating circuit 17 and will allow him to adjust the variable resistor 16 in order to decrease (or increase) the maximum current value flowing through the emitter-collector line of transistor 14, i.e., the maximum available current intensity of the preignition pulse.

The current flowing through transistor 14 as a general case is not the whole current in the gap. One part of this current flows through the clamping branch 11, 12. The distribution of the total preignition current between the gap and the clamping branch is conditioned by the distance d of the gap which should be adequately fixed. In the majority of cases this distance d is established by means of a servo-motor which gives automatically the desired value of that distance d. It will be seen further how such a servo-motor can, for example, function automatically. Generally, the conditions are such that the current intensity in the clamping branch 11, 12 is approximately the same as that in the gap.

The embodiment according to FIG. 3 offers the advantage of giving a "limited value of the preignition pulse current" which normally is adjusted by means of the variable resistor 16. This limit value of the current value available for the preignition is, in some way, memorised by the value of the variable resistor 16, taking into account the auxiliary source 15.

The adjustment of the available preignition energy (maximum intensity of the current flowing in the emitter-collector line of transistor 14) is made manually, being thus memorised according to the embodiment of FIG. 3. In the embodiment according to FIG. 4, this adjustment is automatic. The limitation of the current intensity in the emitter-collector line of transistor 14 occurs only when the current in resistor 12, i.e., the current in the voltage clamping brach, exceeds a certain limit value. Therefore, in the embodiment according to FIG. 4, we find once more transistor 14, the emitter-collector line of which is suitable to limit the available preignition current (i.e, the sum of clamped and preignition current). But, in addition, in the embodiment of FIG. 4, transistor 14 is controlled by means of a circuit comprising transistor 22, controlling the preignition current, an auxiliary voltage source 15, a resistor 23 and an adjustable resistor 24. The resistor 23 is connected to the negative pole of the auxiliary source 15 and also to the point of connection between Zener diode 11 and resistor 12 in the clamping branch. Resistor 23 acts particularly as a neutralizing resistor of the overflow current in transistors 14 and 22. If no current is flowing through resistor 12, the negative pole of the auxiliary source 15 is at the same potential as that of the electrode-tool (El), which means that the quasi totality of the auxiliary source voltage 15 is directed to the variable resistor 24. Transistor 22 is mounted as can be easily seen as "emitter-follower" and the current delivered by the emitter of transistor 22 is approximately equal (if it can be considered as negligible in the resistor 23) to the quotient of the auxiliary source voltage 15 on the resistance of variable resistor 24, multiplied by the amplification coefficient of transistor 22. It is this current of the emitter of transistor 22, which controls transistor 14 by its emitter-base line. When there is a voltage drop in resistor 12, the negative pole of the auxiliary source 15 attains a potential inferior to that of the electrode-tool (El) and the voltage which remains across variable resistor 24 drops at the same rate, decreasing automatically the current which controls transistor 14. If the voltage drop in resistor 12 becomes important, transistor 22 can even be completely blocked, blocking thus transistor 14, but then the current through resistor 12 is decreasing also, which means that in fact this blocking does not occur, and the process leads to a "stabilised state by a reaction effect". The current flowing through resistor 12, which is less influenced by this stabilised state, as it can be easily understood when applying the rules of electronic circuits, is controlled by the variable resistor 24.

In working conditions, the maximum current intensity authorized to flow through the emitter-collector line of transistor 14 in FIG. 4 is not fixed as strictly as in the case of the embodiment FIG. 3, but a priori, is very high. It is only when an important clamping current intervenes that the limit current intensity through transistor 14 is reduced by the effect of transistor 22 and adjacent components. The advantage of the circuit according to FIG. 4 is that, if the clamped current tends to increase, its limitation through transistor 14 becomes automatically more effective so that the circuit adapts itself automatically to different conditions (for example, in the case of a "hesitating" ionization, when the electrode-tool is too distant from the workpiece). The advantage of the circuit with an automatic limitation of the available preignition current, according to FIG. 4 is that, when the electrode-tool, for any reason, is too distant from the workpiece, the cutting out of the preignition pulses is sharp and there exists no working period with an incorrect and insufficient channel ionization.

On FIG. 4, it is foreseen but not compulsory, a first semi-clamping branch 19, 20, 21, connected upstream to transistor 14, but downstream to resistor 8 and diode 9. It was established that the effect of an automatic energy limitation controlled by transistor 22 is more efficient if the voltage available is previously clamped and this is just the function of the clamping branch 19, 20. It is nevertheless clear that the total voltage drop in Zener diode 19 and in resistor 20 is naturally superior to the total voltage drop in diode 11 and resistor 12, otherwise the effect of the clamping branch as such 11, 12, would be nil. At any case, diode 21, provided for contingencies, is not indispensable, even if one foresees a preliminary clamping branch (or preliminary semi-clamping) comprising Zener diode 19 and resistor 20. The circuit of FIG. 4 provides a complete and automatic control of preignition pulse electrical parameters, i.e., its peak voltage and energy available for channel firing.

Figure 5:
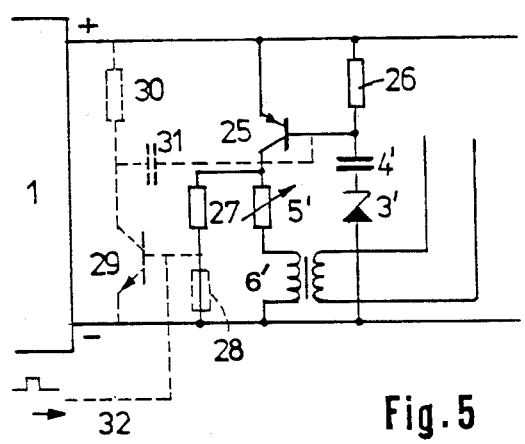
FIG. 5 is a partial schematic of a variant which can be advantageously applied, in certain cases, to substitute the part of the circuit feeding the primary of the transformer generating preignition pulses.

FIG. 5 shows a possible modification at least interesting in some cases regarding components controlling the current flow in the primary of the transformer delivering the preignition pulses. In the alternative circuit according to FIG. 5, we find components 3', 4', 5' and 6', homologous to components 3 to 6 of FIGS. 2, 3 and 4, but differently arranged.

On FIG. 5 is provided a transistor 25 with sneak current neutralizing resistor 26, controlled by its base and branch junction of Zener diode 3' in series corresponding to diode 3 of FIGS. 2 to 4. On the other hand, in series with the emitter-collector line of transistor 25, is connected the transformer 6' primary which is also in series with adjustable resistor 5', corresponding to resistor 5 on FIGS. 3 and 4. Resistor 27 is connected across this series circuit of transformer 6' primary and adjustable resistor 5', in order to form a line allowing, if necessary, the flowing of a current which demagnetizes transformer 6'. FIG. 5 represents, similarly to FIGS. 2 to 4, a particularity according to which, because of the presence of an element avoiding a direct galvanic connection (such as condenser 4' corresponding to condenser 4 of FIGS. 2 to 4), no current flows permanently or semi-permanently in the preignition circuit, so that this last is conducting no current other than that of preignition pulse generation. Besides, the circuit of FIG. 5 allows the application of the transformer primary of a voltage practically equal to that supplied by feeding circuit 1. This voltage applied to the transformer primary being not—as in case of FIGS. 2 to 4—limited by Zener diode 3 or 3', it allows to use a transformer with a lower transformer ratio. In the utmost case, taking into account that the preignition pulse is superposed or added on the voltage supplied by erosive pulses feeding circuit 1, transformer 6' could be even not a step up transformer because, in principle, it would be sufficient if the preignition voltage is considerably higher than the erosive pulse voltage. In practical applications, the preignition voltage being preferably superior to the double of the erosive pulse voltage, transformer 6' will be, in spite of all, at least slightly step up, but this is not an absolute necessity.

On FIG. 5, it is also represented in dotted lines an additional possibility which can present some interest. It concerns the part of the circuit comprising resistor 28 in series with resistor 27, transistor 29, the emitter-base line of which is connected in series with resistor 28 and a ballast resistor 30 connected on the collector of transistor 29. A coupling condenser 31 connects in addition the collector of transistor 29 with the base of the ignition controlling transistor 25. When transistor 25 conducts, transistor 29 becomes also conducting by means of condenser 31, and this conduction is maintained at least during the charging time of condenser 31 and, even if the current flowing through Zener diode 3' and condenser 4' is not sufficient to control firing of transistor 25.

One should note that the circuit of FIG. 5, as well as that with the adding of the circuit represented in dotted lines, is a type of circuit which does not consume any current at rest.

Moreover, on FIG. 5 is represented an additional input 32 which can be interesting, allowing, if necessary, a supplementary preignition pulse. On FIG. 5 is represented a possibility of preignition pulse control 32, on the base of coupling transistor 29, but obviously it is also possible to connect it on some other point of the circuit.

It should also be noted that the circuit in dotted lines on FIG. 5 provides means for a flip-flop preignition pulse control. This control allows for example to calibrate the preignition pulse duration independently from the control provided by means of Zener diode 3, 3' and condenser 4, 4', which depends on voltage characteristics supplied by circuit 1, delivering erosive pulses.

Let us consider now FIGS. 6 and 7. They represent skeleton diagrams (upper part) and voltage and current diagrams (lower part). FIG. 6 illustrates the case of application of a "relaxation" type circuit for erosive pulse generation such as, without considering the preignition system, is represented in the previously mentioned U.S. Pat. No. 3,893,013. Across points a, b, a', b' of FIG. 6 is connected the preignition system such as represented on FIGS. 2 to 4.

The lower part of FIG. 6 shows voltage and current diagrams in the machining gap. The charging voltage across the machining capacitor delivering erosive pulses (or machining condensor) first increases up to the value $U_f$ where the preignition process starts. The voltage reaches then the preignition peak voltage $U_{pr}$. The discharge channel being fired, the voltage falls to a relatively low value of about 20–30 volts, remaining there with a characteristic substantially flat until the erosive pulse end. After the channel ignition by peak voltage $U_{pr}$, the erosive pulse current increases gradually following substantially a semi-sinusoidal alternation reaching its maximum then falling to zero. At this moment, the channel is deionized and no current is flowing in the opposite direction (this is anyhow prevented vented by diodes 7 and 10).

On the upper part of FIG. 6, one sees also, in series with the principal machining condensor, a variable inductor intended to support voltage shocks occuring at the moment when the channel is open. This inductive impedance contributes also to "soften" the jumps of current which otherwise would be too big.

FIG. 7 illustrates, similarly to FIG. 6, the possibility of the application of a preignition system not to a "capacitor" or "relaxation" type machining circuit, but to an electronic circuit with "on" and "off" commutation fed by an energy source providing an adequate voltage ($U_f$) to control the preignition and a current sufficient for electroerosive pulses. The voltage will be then lower in order to correspond to that of the erosive pulses.

The lower part of FIG. 7 shows that in this case, the working of the preignition circuit is practically not modified. As regards the shape of the erosive pulse current, they take a more "rectangular" form.

The preignition system connecting points a, b a' and b' of FIG. 7 are similar to those of FIG. 6, connecting this preignition circuit.

Mention has been made several times to the means for the positioning of the electrode-tool which exist practically in all electro-discharge machines and which are normally present in machines with the circuit according to this invention. It has been even stated that these electrode positioning means which allow the clamping system develop all its advantages, particularly in the case when resistor 12 is of low value and the clamping branch essentially formed by Zener diode 11 has not only voltage reducing characteristics, but also that of voltage stabilization.

Generally speaking, the electrode-tool positioning means comprise a motor controlled for approaching the electrode to the workpiece or removing it therefrom. This motor is controlled with classical means; usually one has means reacting to different parameters—electrical or mechanical—which can be detected on the machining circuit.

Substantially, there are three conditions: that of approaching the electrode to the workpiece (the motor runs in one direction), that where no electrode movement is necessary (the motor does not turn) and that where the electrode must be removed (the motor turns in the opposite direction).

We shall mention here some of the numerous methods according to which different parameters can constitute criteria for controlling the electrode positioning. The first method which will be described can be applied to the machines of previously known systems as well as to machines with the circuit according to the invention. Another method possible with previously known systems, but not applicable to the circuit according to the invention, can nevertheless be applied, with some modifications, to the proposed circuit. In this case, this method can be particularly advantageous to control the electrode positioning. On the various schematic diagrams previously described, points x y z, m q and w are shown. The voltages between some of these points can be considered as criteria for electrode positioning control. It should be noted that choosing a voltage between two of the abovementioned points, the voltage will be determined by the first point related to the second one (for example, in the case of voltage x y, and the reference voltage across resistor 12, x is positive related to y).

The first method to secure a motor control for electrode positioning is to use as information the signal q x (FIGS. 2 to 4) or m w (FIG. 1). If this signal is always positive, it means that probably there is a short-circuit or arc in the gap and it is necessary to remove the electrode. If this signal is always nil, or negative, it means that there is no current in the gap and it is necessary to approach the electrode to the workpiece. If there are positive voltage pulses separated by a certain off-time with nil or negative voltage, it is necessary to consider, as a second criterion, the signal x m (FIGS. 1 to 4). If this signal is in the form of pulses in which the peaks reach the consigned value (such as $V_{cs}$), that means that the gap has a proper value and the motor should not move. If this signal x m presents peaks of voltage which are inferior to that value $V_{cs}$, that means that the gap is too small and it is necessary to remove the electrode. On the contrary, if the peaks of voltage of the signal x m are considerably superior to the value $V_{cs}$, that means that the motor should diminish the gap.

One should note that the possibility of the absence of pulses of the signal x m can be only in two cases determined by the signal q x (or m w), and where the signal x m does not intervene.

Another method of control, applicable previously, consisted in using only the signal x m and determining exclusively what the first method used only as auxiliary in function of this signal x m. Nevertheless, it should be noted that cases can occur where no pulses appear on the signal x m. This can correspond to a short-circuit in the gap which needs the removing of the electrode, as well as to a too low feeding voltage, which needs the approaching of the electrode. In order to avoid this difficulty, the electrode would be lifted, which anyway would stop the short-circuits and also the discharge in the gap, followed by a progressive approaching of the electrode until the pulses resume again normally.

Nevertheless, this second method, used previously, cannot be applied with a circuit according to invention (FIGS. 2 to 4). Indeed, in this case, the voltage $V_{cs}$ will be that of the Zener diode 11, and signal x m will never be able to transcend this voltage. However, this second method presents the advantage that it is not obliged to measure the voltage drop on such a diode as diode 7 (FIGS. 2 to 4) or Diode $D_2$ (FIG. 1).

The circuit according to the invention presents nevertheless the advantage to apply the second method, but using another criterion allowing to know when the electrode should be lifted. On FIGS. 2 to 4, is represented in dotted lines a resistor $12_a$ in series with the line conducting the preignition voltage and current. This complementary resistor is approximately of the same value as resistor 12. It becomes then possible to measure both voltages z x and x y. If these two voltages indicate even approximately the same intensity of current, it means that the whole current generated in the secondary of the transformer 6 is directed on the clamping branch 11, 12, i.e., there is no active preignition pulse in the gap (the voltage may appear but it is insufficient to create the preignition). One can infer then that the motor should approach the electrode.

Moreover, the indetermination of the previous realizations necessitated a "to and fro" movement of the electrode. According to the invention, the case when no pulses were present in the signal x m can be solved by admitting that in the variant of FIG. 5, the included circuit shown with dotted lines transmitting a pulse on connection 32, tends to apply a supplementary preignition pulse. If this pulse intervenes, creating effectively the preignition, the machining process will continue normally with, at the best, a correcting lifting of the electrode, if the pulse x m is too weak. If no pulse intervenes after the application of a controlling pulse on the input 32 (FIG. 5), that means that there is a probability of a short-circuit which needs a lifting of the electrode. Finally, if the preignition pulse is generated but does not produce an effective firing of the channel, the situation can be detected by means of signals z x and x y, as mentioned above, which will need the approaching of the electrode. Thus, with the circuit according to the invention, using only voltages on points x, y, z, m, it is possible to realize an automatic control which is, simple and efficient, of the device (motor) of the positioning of the electrodetool (El) relative to the workpiece (Pi). In the case where there is no possibility of sending a preignition pulse, the absence of pulse in the signal x m could be naturally treated as in the previous systems. It should however be noted that, with the circuit according to the invention, the risk of such a difficult situation is extremely small.

It should also be noted that in the preignition system according to the schematic diagrams of FIGS. 2, 3 and 4, as soon as the channel is ionized, the energy of the preignition pulse, generated in the secondary of transformer 6, has a tendency to flow through this highly conductive channel in a very short time. Therefore, the current intensity of this pulse can reach rather high values.

This will have a double consequence:

(a) The preignition pulse being of a very short duration, the current intensity of this pulse cannot be efficiently controlled by transistor 14. (FIG. 3 and 4) which is controlled by the potential difference on resistor 12 of the voltage clamping branch, the current rise being too stiff. The preignition pulse becomes then a pulse of high voltage and high current intensity. It could confer then to this pulse the erosive pulse characteristic with an important electrode wear.

(b) If the preignition pulse current intensity is diminished simply in diminishing the pulse energy, its duration will remain nevertheless very short. A rapid stop of this pulse current can create then a delay between the end of the preignition pulse and the beginning of the erosive pulse. This can provoke a partial or even total deionization of the channel, so that the erosive pulse fed by a voltage lower that that of the preignition pulse, could not pass. That will provoke failing (or misfires), the erosive pulses will not be always following the preignition pulses.

Experience shows that the channel ionization can be maintained even with a very low current intensity. But, on the other hand, it is necessary that the ionization created by the preignition pulse should be maintained long enough to be picked up by the erosive pulse current. This can be realized by the insertion in the secondary of transformer 6 (FIGS. 2, 3, 4) of a resistor $12_a$ of a rather important value, which will attenuate the pulse current intensity prolonging at the same time its duration.

Thus, the channel ionization will be realized with a pulse of high voltage and low current intensity, and the ionization will be easily maintained with the starting erosive pulse current, even if the current rise (di/dt) is very slow. The process becomes then continuous and stable without failings and erosive pulse energy variation.

Figure 8:
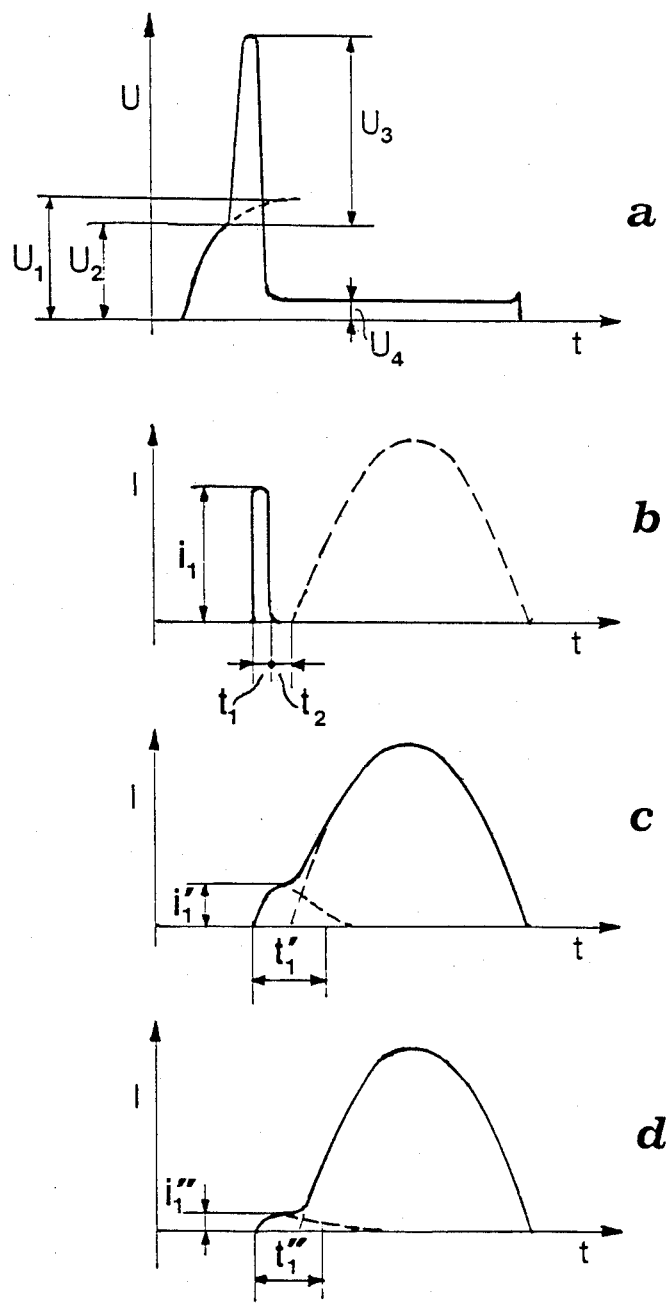
FIG. 8 illustrates by diagrams in function of time a particular aspect observed in certain embodiments of the invention.

This phenomenon is represented on FIG. 8a, b, c, and d.

FIG. 8a is a diagram of the voltage between the electrode and the workpiece, where $U_1$ is the voltage connecting the preignition pulse feeding (voltage of Zener diode 3, FIG. 2, 3, and 4), $U_3$ is the preignition pulse voltage (generated in the secondary of transformer 6), and $U_4$ the discharge arc voltage (voltage of erosive pulse current flowing).

FIG. 8b shows the preignition pulse current in the case when resistor $12a$ is not inserted in the circuit. The preignition pulse current $i_1$ is then very high and its duration $t_1$ is very short. Therefore, the erosive pulse current cannot follow immediately the preignition pulse, creating a delay $t_2$. Erosive pulse "failings" will then occur.

FIG. 8c shows the phenomenon with the insertion of resistor $12a$. The preignition pulse current intensity $i_1$, is lower and its duration $t_1$, is prolonged. The pick-up of the ionization created by the preignition pulse is secured by the erosive pulse current. Nevertheless, the current curve of this pulse is slightly deformed.

FIG. 8d represents the same conditions but with a higher value of resistor $12a$. The ratio preignition pulse voltage/current remains always valid for a good channel ionization, but the erosive pulse current curve has only a very slight deformation which cannot influence the characteristics of this pulse. To be noted that $i_1''$ and $t_1''$ are respectively the current of the preignition pulse and its efficient duration.

In these conditions, the control of the preignition pulse current by means of transistor 14 becomes more efficient. The preignition pulse energy is controlled automatically to its optimal value, just sufficient to produce a good channel ionization, without any risk for the machining erosive pulses.

Thus the preignition system realizes in a particularly advantageous way a real adaptive control leaving intact the erosive pulse parameters.

I claim:

1. An electrical discharge machining circuit for a machine working a workpiece by electro-erosive discharges through a dielectric medium in a machining gap between an electrode-tool and said workpiece which constitutes itself the second electrode of said gap, comprising:

erosive discharge means having a pair of output terminals for supplying said electrodes with repetitive pulses of erosive electrical energy, and preignition means for providing, in prologue to said erosive pulses, preignition pulses of a higher voltage but of a lower energy than said erosive pulses, said preignition pulses ionizing said dielectric medium in said machining gap so as to create each time a channel which thereafter allows an erosive discharge to flow therethrough.

said preignition means comprising clamping means connected directly across said machining gap and having high voltage and low energy parameters which correspond to the voltage and energy parameters of said preignition pulses, said clamping means being operative to limit the voltage of said preignition pulses on said electrodes if the voltage of said preignition pulses tends to exceed a reference value related to said high voltage parameter of said clamping means, and said preignition means further comprising an input for receiving a signal which, independently of voltage changes on said output terminals, causes generation of a complementary preignition pulse which is applied in replacement of a normal preignition pulse.

2. An electrical discharge machining circuit for a machine working a workpiece by electro-erosive discharges through a dielectric medium in a machining gap between an electrode-tool and said workpiece which constitutes itself the second electrode of said gap, comprising:

erosive discharge means having energy delivering output terminals which repetitively deliver high current erosive pulses to said electrodes and which exhibit corresponding voltage pulses, and preignition means for providing, in prologue to said erosive pulses, preignition pulses of a higher voltage but of a lower energy than said erosive pulses, said preignition pulses ionizing said dielectric medium in said machining gap so as to create each time a channel which thereafter allows an erosive discharge to flow therethrough, said preignition means comprising a step-up transformer and a preignition control circuit connected to both the primary winding of said transformer and to said output terminals of said erosive discharge means, said preignition control circuit comprising a Zener diode and being arranged to respond to the arrival of a certain value of voltage across said terminals to cause a current to flow from said terminals through said primary winding, said preignition control circuit comprising a preignition control transistor the base of which is connected to said Zener diode and the emitter-collector track of which is connected in series with said primary winding of said transformer, said preignition control circuit further comprising a pulse feedback loop that includes an amplifying transistor and a capacitor through which a reactive potential can be applied to the base of said preignition control transistor so as to give an abrupt reinforcement of a current in said base once initialized through said Zener diode, and said preignition control circuit including an input for receiving a signal which, independently of voltage changes on said output terminals, causes a one-shot double triggering of said transistors for generating a complementary preignition pulse, said signal being applied in replacement of a normal preignition pulse.

3. An electrical discharge machining circuit for a machine working a workpiece by electro-erosive discharges through a dielectric medium in a machining gap between an electrode-tool and said workpiece which constitutes itself the second electrode of said gap, comprising:

erosive discharge means comprising a capacitor and means for charging and discharging said capacitor, and means responsive to the discharge of said capacitor for supplying said electrodes with repetitive pulses of erosive electrical energy, and preignition means for providing, in prologue to said erosive pulses, preignition pulses of a higher voltage but of a lower energy than said erosive pulses, said preignition pulses ionizing said dielectric medium in said machining gap so as to create each time a channel which thereafter allows an erosive discharge to flow therethrough, said preignition means comprising a step-up transformer having a primary winding and a secondary winding, first clamping means including a first Zener diode connecting said capacitor to said primary winding of said transformer, said first clamping means being operative to control the initiation of current flow through said primary winding during the charging of said capacitor, the secondary winding of said transformer being connected across said machining gap, and second clamping means connected across said machining gap on the secondary side of said transformer, said second clamping means including a second Zener diode and having high voltage and low energy parameters which correspond to the voltage and energy parameters of said preignition pulses, said second clamping means being operative to limit the voltage of said preignition pulses across said gap if the voltage of said preignition pulses tends to exceed a reference value related to said high voltage parameter of said second clamping means.

4. The machining circuit of claim 3, wherein said preignition means further comprises an input for receiving a signal which, independently of voltage changes on output terminals of said erosive discharge means, causes generation of a complementary preignition pulse, which is applied in replacement of a normal preignition pulse.

5. The machining circuit of claim 3 including means for automatically positioning said electrode-tool to provide a convenient gap-distance between said two electrodes, said second clamping means including at least one voltage limiting component for defining said reference value, said component being connected to said electrodes by conduction paths that avoid any substantial voltage drop.

6. The machining circuit of claim 3, wherein said preignition means further comprises current limiting means for setting the maximum energy value of each preignition pulse.

7. The machining circuit of claim 6 wherein said current limiting means are arranged to automatically limit the energy of said preignition pulses, said current limiting means including a transistor and a control circuit for said transistor connected to said second clamping means and operative to cause said transistor to automatically decrease its conduction when a current in said second clamping means exceeds a determined value.

8. The machining circuit of claim 7 wherein said control circuit comprises a manually adjustable component for regulating said determined value, said second clamping means comprising, in series with said second Zener diode, a resistor which delivers to said control circuit a voltage representative of said current in said second clamping means.

9. The machining circuit of claim 3 wherein said preignition mean is operative to give each of said preignition pulses a predetermined energy defined by parameters of voltage, current, and duration, said preignition means including a controllable transistor element for defining the current and duration parameters of said preignition pulses, said voltage parameter of said preignition pulses being defined by said second clamping means.

* * * * *